May 11, 1926.
I. J. BEVINS
1,584,505
PROCESS FOR CLEANING AUTOMOTIVE POWER PLANTS
Filed Oct. 15, 1924
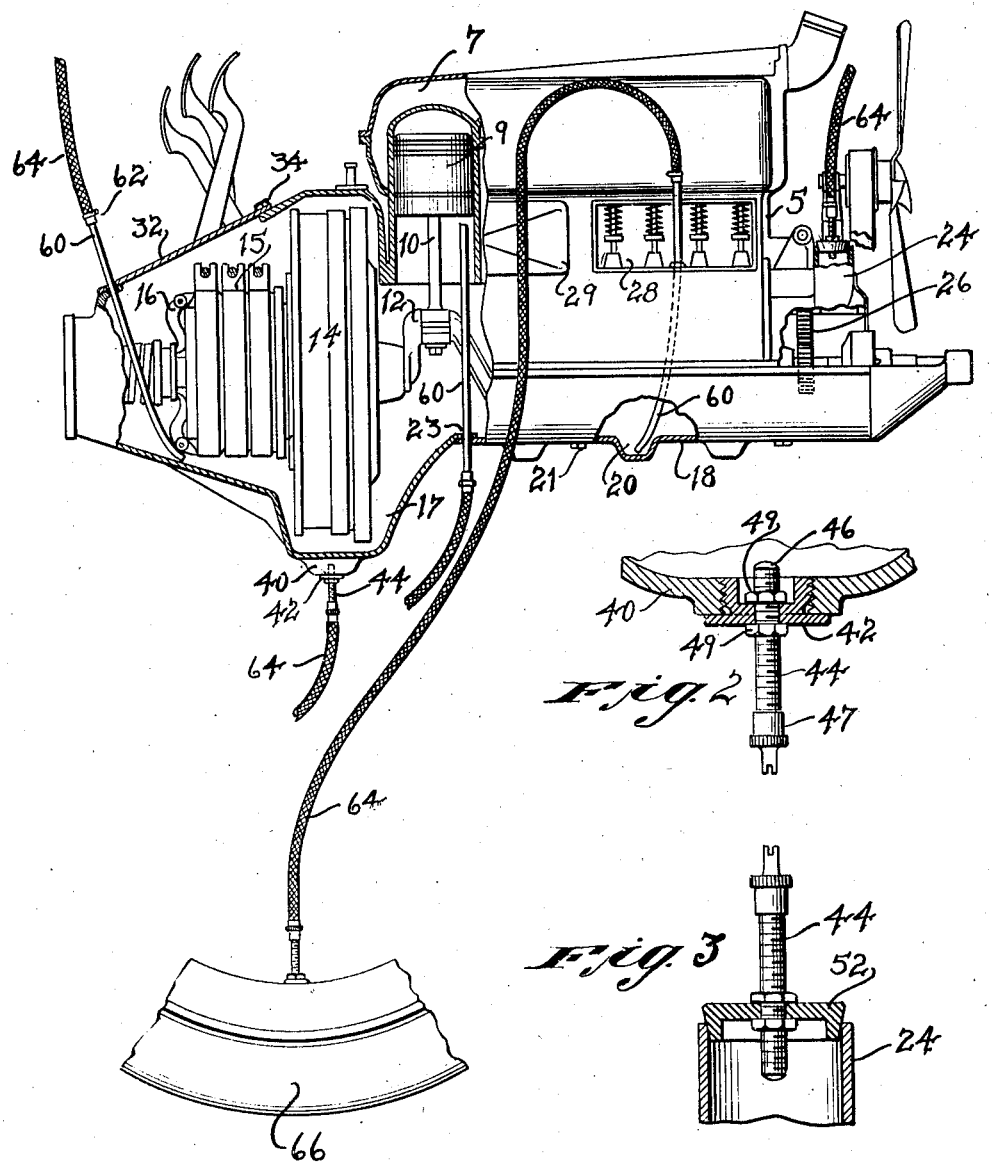
INVENTOR
I. J. BEVINS
BY Myron P. Laughlin
ATTORNEY Patented May 11, 1926.

1,584,505

UNITED STATES PATENT OFFICE.

IRA JESSE BEVINS, OF CHICAGO, ILLINOIS.

PROCESS FOR CLEANING AUTOMOTIVE POWER PLANTS.

Application filed October 15, 1924. Serial No. 743,738.

This invention relates to the cleaning of internal combustion engines and more especially to process and apparatus for cleaning automotive power plants.

It is the purpose of this invention to provide means whereby the internal parts of an automobile engine, transmission, and gears may be cleansed and whereby the cleaning fluid may be thoroughly purged from the engine, transmission, or gears, before a lubricant is again introduced.

Kerosene, and like petroleum derivatives, have long been known as highly satisfactory mediums for the cleaning of bearings, and of bearing surfaces, in machinery. These oils have the property of working their way between surfaces even though rusted together and of removing any dirt which may be therebetween. However the use of kerosene, or its equivalent, has not been recommended by lubricating engineers for it has proven almost impossible to remove it from the machinery after the cleansing operation, the unremoved remainder diluting the new lubricant introduced and seriously impairing its lubricating properties. This trapped cleansing liquid also contained considerable quantities of grit, dirt, and metal particles, which became mixed with the lubricant and which further reduced its lubricating properties. These difficulties have been especially troublesome in connection with automotive machinery, for often parts of the engine, transmission and gear case are below the drains and cannot be completely emptied. Furthermore, it is customary to provide the crank cases of internal combustion engines with transverse troughs intended to contain lubricant into which the cranks dip for the lubrication of the engine. These troughs are especially difficult to drain and have proven receptacles for sediment and cleansing fluid which could not be removed without dismantling the engine.

In cleansing automotive machinery the time available is usually limited and it is often impossible to dismantle and remove the various parts. On the other hand automotive machinery usually operates at high speed and especially requires the benefit of the maximum lubricating qualities of the lubricant employed.

The herein disclosed invention permits the use of any desired cleansing material or fluid, provides for its application to the parts to be cleansed and especially provides for its complete removal together with any sediment or other material which may have been washed from the parts, as it is essential in systems which are to be used by the average automotive operator or mechanic, it is simple, easily applied, requires no special operating knowledge, and can be practiced with a minimum removal of automobile parts.

The attached drawing will serve to show an embodiment of apparatus and to illustrate my process as applied to a well known form of automobile power plant; it being understood that certain modifications in apparatus and application thereof are contemplated with other forms of automotive power plants well known to those skilled in the art.

Figure 1 is an elevation of an automotive power plant, parts of the casing being shown as broken away, for purposes of illustration.

Figure 2 shows a detail of the apparatus, the lower portion of the engine casing being shown in fragmentary section with my preferred form of special plug in place and mounting one embodiment of an air connection suitable for my purpose.

Figure 3 is a further detail view of a part of the apparatus employed and is a portion of the engine casing being shown in fragmentary section, as is the preferred form of plug I employ, while the air inlet tube is shown in elevation.

Referring to Fig. 1; the automotive engine 5 is equipped with the usual water jacket 7, pistons 9, connecting rods 10, crank shaft 12, fly wheel and generator 14, transmission bands 15, clutch mechanism 16, main oil reservoir 17 and crank case bottom plate 18 provided with supplementary oil reservoirs 20. This particular form of engine is also provided with an oil filling tube 24, with timing gears 26, with push rod chambers 28 having removable covers 29 and with a removable transmission cover 32 held by the screws 34. It is also provided with an oil draining plug connection 40 which in normal operation is closed by a solid plug. For this solid plug I substitute a special connection plug 42 provided with an air inlet valve 44 discharging through a nozzle 46 and adapted to be closed by a removable cap 47 which engages a threaded end portion to which a hose may be connected. The details of this plug connection are best seen at Fig. 2 and while the attachment between parts 44 and 42 is shown as accomplished by means of suitable nuts 49, it will be understood that member 44 may be integral with the plug 42 or may be attached thereto by any suitable method.

Referring to Fig. 3; oil filling tube 24, which forms part of the engine, I provide with a special closure cap 52, preferably of resilient material and capable of forming a tight joint with tube 24. Cap 52 serves to mount a device 44, similar to that described in connection with Fig. 2. The device 44 has been shown as a simple threaded tube but manifestly it may assume other forms since its purpose is the introduction of a jet, of compressed air, or compressed air and cleaning fluid. To prevent the return of gases, air or liquid from the engine crank case, I prefer to incorporate within device 44 a suitable form of check or non-return valve, that used in the ordinary forms of tire valve serving to fulfill my purposes. Description of the internal mechanism of device 44 is omitted since such non-return mechanisms are well known to those skilled in the art.

As a further aid in the application of the cleansing fluid to certain parts of the automobile mechanism and to assist in removing sediment and cleansing fluid from the parts, I provide an elongated nozzle 60 secured as at 62, to a suitable hose or conduit 64.

The operation of the hereinbefore described apparatus and the method of performing my process is briefly as follows:

The draining plug is removed from drain connection 40 and the body of lubricant contained within the main oil reservoir 17 is discharged. This first step is preferably accomplished while the engine is hot and directly after it has been used. The drain plug in drain connection 40 is then replaced by the special plug 42 and a quantity of cleansing fluid is introduced through the oil inlet and breather tube 24. Plug 52 is then inserted in tube 24 and connected through hose 64 with a source of compressed air or gas supply 66. Air admitted through hose 64 and device 44 discharges in a jet over the timing gears 26, thoroughly cleaning them of sediment and dirt loosened by the cleaning fluid previously introduced. This removes the cleaning fluid and thoroughly drains the timing gears.

As an aid to operation the starting mechanism of the engine may be operated to slowly rotate the engine a few revolutions thus exposing all parts of the timing gears. Hose 64 is then disconnected from plug 52 and connected with the device 44 in plug 42. Compressed air is again admitted and drives cleaning fluid which has drained to the main oil reservoir 17, over the transmission devices 14, 15, and over the crank shaft 12, connecting rods 10, wrist pins and the interior of pistons 9.

This operation thoroughly washes out the magneto, fly wheel, transmission, clutch mechanism, and all bearings of engine 5, washing the grit and dirt downward to the bottom of the crank case and to the main oil reservoir. The engine may be again rotated a few turns by hand, or by the use of the starter mechanism, to expose all of the parts.

Heretofore it has been customary to run the engine under its own power, and necessarily at a considerable speed, to circulate the cleansing fluid employed. This often seriously damaged the engine bearings while failing to thoroughly cleanse them. It is a special feature of my method and apparatus that operation of the engine for more than a few turns, or at any considerable speed, is avoided and becomes entirely unnecessary.

Plug 42 is now removed from the drain connection 40 and such cleansing fluid as may be in reservoir 17, together with the sediment and dirt which it will contain, is removed. If convenient the front end of the engine may be raised to drain a further portion of the cleansing fluid which has been trapped in troughs 20 and other parts of the engine. However, under ordinary conditions it is practically impossible to elevate the engine sufficiently to completely drain troughs 20 of liquid and dirt. These troughs 20 and similar catch basins, have been perhaps the principal cause of failure in former cleaning operations. By ordinary methods it is practically impossible to remove sediment and cleansing fluid from these troughs. Thus, when new lubricant was introduced it became mixed with cleansfluid and dirt, which upon operation of the engine was immediately thrown over the engine parts nullifying such cleaning as may have been accomplished.

A feature of my improved process is the provision for evacuating these troughs. This is accomplished in the following simple manner. Covers 29 are removed exposing valve chamber 28, nozzle 60 formed of copper tubing or the like is attached to hose 64, any suitable hose connection being employed, and introduced through the opening in the valve chamber bottom, as shown in Fig. 1. Troughs 20 may then be thoroughly blown out by the jet of air issuing from nozzle 60. It is preferable to blow out the front trough first, then the remaining troughs in succession impelling all cleaning fluid and sediment to the main reservoir 17 and thence through connection 40, to the exterior of the crank case.

This operation thoroughly cleans and dries these troughs. As a further aid to removing cleaning fluid and sediment from the parts it has been found preferable to remove one, or more, stud bolts 21 and to introduce nozzle 60 through the bolt opening, as shown at 23 in Fig. 1. The interior of the pistons and the piston rods, cranks and interior of the cylinder are thus dried and cleaned.

The transmission and gear mechanism may also be blown out and dried by the removal of a screw, or screws, 34 of transmission cover plate 32, as shown in the left of Fig. 1. This provides for the removal of all cleaning fluid, dirt and foreign particles, to reservoir 17 from which they may be blown out by removal of plug 42. The standard solid plug can then be replaced, or, if desired plug 42 may be put in place, the non-return valve preventing lubricant loss. Plug 52 may then be removed and the new lubricant introduced to a perfectly clean, dry engine and transmission.

In cases where a ready source of compressed air, or cleaning gas, is not available, it has been found practical to utilize a tire, or tires, of the vehicle as a source of such air supply, it being understood that it is preferable to utilize a spare tire if the motor vehicle is so equipped.

It will be noted that the apparatus disclosed is simple, easy of application, inexpensive, readily transportable in the tool space of the motor car, and is operable by the most inexpert driver. The improvements effected by this invention will be appreciated when consideration is given to the lubricating difficulties now so prevalent in automobile operation, the thorough removal of sediment and cleansing fluid provided by the herein disclosed process and apparatus eliminating many of such difficulties. It will be understood that many changes and modifications may be made in the adaptation of this invention to other forms of automotive power plant, and to engine and power transmission mechanism generally.

What I specifically point out and claim is:

1. In a process for cleansing automotive power plants, the steps which comprise, introducing cleansing fluid to the oil reservoir, applying compressed air to said reservoir to scatter the cleansing fluid over the engine parts, draining the cleaning fluid from said reservoir, then applying compressed air in jets to the engine parts to eliminate cleansing fluid therefrom, and finally applying said compressed air jets to said reservoir to remove cleaning fluid therefrom.

2. The process of cleansing automotive power plants which comprises applying cleansing fluid through the oil filling device to partially fill the engine oil reservoir, applying compressed air beneath the surface of said cleansing fluid to drive the same over the engine parts, then applying compressed air to the engine parts to remove the cleaning fluid, then draining the cleaning fluid from the oil reservoir.

3. In a process for cleansing automotive machinery provided with a main oil reservoir and a series of supplemental reservoirs, the steps which comprise, introducing cleaning fluid to said main reservoir, applying an atomizing agent to said cleaning fluid to drive it over the engine parts, applying air in jets to clear said supplemental reservoirs, and aid drainage of said cleaning fluid to the main reservoir, applying compressed air to dry the parts, and draining the cleaning fluid together with the removed dirt.

4. In a process for cleaning automotive power plants, the steps which comprise, introducing a cleaning fluid, applying compressed air to the oil inlet to drive said fluid over a portion of the engine parts, applying compressed air to the lubricant drain opening to drive the cleansing fluid over the remaining engine parts, then applying compressed air in jets to the interior of the automotive mechanism to drive out the remainder of the cleansing fluid and to dry the engine parts, then draining the cleaning fluid and dirt through said lubricant drain.

Signed at Chicago, Illinois, in the county of Cook and State of Illinois this sixth day of October A. D. 1924.

IRA JESSE BEVINS.